US011403767B2

(12) United States Patent
Dahal et al.

(10) Patent No.: US 11,403,767 B2
(45) Date of Patent: Aug. 2, 2022

(54) METHOD AND APPARATUS FOR DETECTING A TRAILER, TOW-BALL, AND COUPLER FOR TRAILER HITCH ASSISTANCE AND JACKKNIFE PREVENTION

(71) Applicant: Valeo North America, Inc., Troy, MI (US)

(72) Inventors: Ashok Dahal, Troy, MI (US); Jakir Hossen, Troy, MI (US); Muhammad Amasha, Troy, MI (US)

(73) Assignee: Connaught Electronics, Ltd., Tuam (IE)

( * ) Notice: Subject to any disclaimer, the term of this patent is extended or adjusted under 35 U.S.C. 154(b) by 37 days.

(21) Appl. No.: 17/021,908

(22) Filed: Sep. 15, 2020

(65) Prior Publication Data
US 2022/0084212 A1    Mar. 17, 2022

(51) Int. Cl.
*G06T 7/20* (2017.01)
*G06T 7/70* (2017.01)
(Continued)

(52) U.S. Cl.
CPC ............... *G06T 7/20* (2013.01); *G06N 3/08* (2013.01); *G06T 7/70* (2017.01); *G06T 7/80* (2017.01);
(Continued)

(58) Field of Classification Search
CPC .... G06T 7/20; G06T 7/80; G06T 7/70; G06T 2207/20081; G06T 2207/20084;
(Continued)

(56) References Cited

U.S. PATENT DOCUMENTS 9,694,749 B2    7/2017  Lynam et al.
10,150,505 B2  12/2018  Herzog et al.
(Continued)

OTHER PUBLICATIONS

Atoum, Yousef, et al. "Monocular video-based trailer coupler detection using multiplexer convolutional neural network." Proceedings of the IEEE International Conference on Computer Vision. 2017. (Year: 2017).*

(Continued)

*Primary Examiner* — Vu Le
*Assistant Examiner* — Tracy Mangialaschi
(74) *Attorney, Agent, or Firm* — Osha Bergman Watanabe & Burton LLP (57) ABSTRACT

Techniques are described for tracking a trailer, including obtaining a sequence of images from a camera positioned in rear of a vehicle, detecting the trailer and a tow-ball in the first image of the sequence of images using a trained learning model based on the first image and at least one scaled version of the first image, estimating an area of interest using a tracking algorithm and locations of the detected trailer and the tow-ball in the first image, estimating a distance between the vehicle and the trailer based on the detected location of the trailer in the first image, and upon determining that the distance between the vehicle and the trailer is less than a second threshold, continuously detecting locations of the trailer, tow-ball and a coupler in each image of the sequence of images using the learning model and the estimated area of interest, and updating the estimated area of interest to correspond to an area of interest in the following image, and actuating an action of the vehicle based on the detected locations of the trailer, tow-ball and the coupler.

17 Claims, 7 Drawing Sheets

(51) Int. Cl.
*G06T 7/80* (2017.01)
*G06N 3/08* (2006.01)
*G06V 20/56* (2022.01)

(52) U.S. Cl.
CPC .... *G06V 20/56* (2022.01); *G06T 2207/20081* (2013.01); *G06T 2207/20084* (2013.01); *G06T 2207/30241* (2013.01); *G06T 2207/30252* (2013.01)

(58) Field of Classification Search
CPC ........... G06T 2207/30241; G06T 2207/30252; G06K 9/00791; G06N 3/08; G06V 20/56
See application file for complete search history.

(56) References Cited

U.S. PATENT DOCUMENTS

| | | |
|---|---|---|
| 10,906,583 B2 | 2/2021 | Li et al. |
| 2018/0215382 A1 | 8/2018 | Gupta et al. |
| 2018/0251153 A1 | 9/2018 | Li et al. |
| 2019/0092109 A1 | 3/2019 | Carpenter |
| 2019/0241032 A1 | 8/2019 | Webster et al. |
| 2019/0337343 A1* | 11/2019 | Ramirez Llanos ............ G06K 9/00791 |
| 2019/0339704 A1* | 11/2019 | Yu ............................ G06T 7/246 |
| 2020/0175311 A1* | 6/2020 | Xu ..................... B62D 15/0285 |
| 2021/0034903 A1 | 2/2021 | Daga et al. |

OTHER PUBLICATIONS

Atoum et al., "Monocular Video-Based Trailer Coupler Detection using Multiplexer Convolutional Neural Network", ICCV.

* cited by examiner

METHOD AND APPARATUS FOR DETECTING A TRAILER, TOW-BALL, AND COUPLER FOR TRAILER HITCH ASSISTANCE AND JACKKNIFE PREVENTION

BACKGROUND

Aspects of the disclosure relate to detecting a trailer, a tow-ball connected to a towing vehicle, and a coupler attached to the trailer in order to assist in hitching the trailer to the towing vehicle and/or preventing trailer jackknife.

Trucks are in high demand in the United States mainly due to their ability to tow trailers ranging from small utility trailers to large recreational vehicles (RVs). The process of connecting a trailer to the towing vehicle is called trailer hitching. During the trailer hitching process, a trailer coupler is aligned and secured to a tow-ball that is attached to the towing vehicle. A successful trailer hitching process requires high accuracy for aligning the trailer coupler and the tow-ball. Maneuvering a vehicle in reverse direction to achieve high alignment accuracy between the tow-ball and the coupler is very difficult and time consuming (even for experienced drivers). Thus, driver assistance systems that partially or fully automate the trailer hitching process could be very useful.

Advanced Driver Assistance Systems (ADAS) have become a common feature in most of modern vehicles. Commonly available ADAS features include lane keep assist, cross-traffic alert, front collision warning, traffic sign recognition and the like. Progress in this area is accelerated by the pursuit of fully autonomous driving (AD). In addition, computational power of embedded system has drastically increased in recent years, which enables designers to deploy more complex systems in the vehicle. There is a need in the art for automated trailer hitch systems or trailer hitch assistance systems that can help a driver of a towing vehicle in connecting the trailer to the towing vehicle and/or continuously tracking the trailer afterwards for jackknife detection and prevention.

BRIEF SUMMARY

Methods, apparatuses, and computer-readable media are disclosed for tracking a trailer, a tow-ball and/or a coupler. In one embodiment, a method includes obtaining a sequence of images from a camera positioned in rear of a vehicle. Field of view of the camera may include at least a tow-ball attached to the vehicle, and a trailer located in the scene behind the vehicle. In addition, the sequence of images may be captured continuously at a sequence of predefined time stamps while the vehicle is moving. As an example, the first image is captured at a first time stamp and the second image is captured at a second time stamp. The method further includes detecting the trailer and the tow-ball in the first image of the sequence of images using a trained learning model based on the first image and at least one scaled version of the first image, and estimating an area of interest using a tracking algorithm and locations of the detected trailer and the tow-ball in the first image. The area of interest corresponds to an area in the second image that will include the trailer with a probability that is higher than a first threshold. Furthermore, the method includes estimating a distance between the vehicle and the trailer based on the detected location of the trailer in the first image. Upon determining that the distance between the vehicle and the trailer is less than a second threshold, the method continuously detects locations of the trailer, tow-ball and a coupler attached to the trailer in each image of the sequence of images using the learning model and the estimated area of interest. The estimated area of interest is then updated to correspond to an area of interest in the following image in the sequence of images. The method further includes actuating an action of the vehicle based on the detected locations of the trailer, tow-ball and the coupler.

In one embodiment, the first area of interest includes an area that is larger than an estimated bounding box for the trailer. In another embodiment, detecting the trailer and the tow-ball in the first image using a trained learning model based on the first image and at least one scaled version of the first image includes scaling the first image using a first and a second scaling factor to generate a first and a second scaled image, respectively.

In one embodiment, the method includes detecting the trailer in the first image using the trained learning model and a first detector to generate the first detected location, and detecting the trailer in the first scaled image using the trained learning model and a second detector to generate the second detected location and detecting the trailer in the second scaled image using the trained learning model and a third detector to generate the third detected location. The method further includes combining the first, the second and the third detected locations to generate a bounding box corresponding to the location of the trailer in the first image.

In one embodiment, estimating the distance between the vehicle and the trailer includes calculating the distance between the vehicle and the trailer using the detected location and one or more calibration values of the camera.

In one embodiment, the one or more calibration values are determined in advance based on a plurality of calibrating images captured by at least a second camera located on a side of the vehicle.

In another embodiment, the method further includes generating a graphical representation of one or more of the detected trailer, coupler and the tow-ball and a trajectory overlay for connecting the tow-ball to the coupler. The action of the vehicle may include displaying the generated graphical representation to a driver of the vehicle to assist in moving the vehicle in reverse direction towards the trailer.

In one embodiment, the method further includes calculating an angle between the trailer and the vehicle while the vehicle is moving by continuously detecting and tracking movement of the trailer. Actuating an action of the vehicle may include actuating a jackknife prevention action to avoid a trailer jackknife situation.

In one embodiment, the action of the vehicle includes determining a trajectory from the vehicle to the trailer using detected locations of the tow-ball and the coupler, and autonomously moving the vehicle in reverse direction towards the trailer by following the trajectory from the tow-ball to the coupler.

In one embodiment, an apparatus for tracking a trailer, a tow-ball and/or a coupler includes a memory and at least one processor coupled to the memory. The at least one processor configured to obtain a sequence of images from a camera positioned in rear of a vehicle. Field of view of the camera may include at least a tow-ball attached to the vehicle, and a trailer located in the scene behind the vehicle. In addition, the sequence of images may be captured continuously at a sequence of predefined time stamps while the vehicle is moving. As an example, the first image is captured at a first time stamp and the second image is captured at a second time stamp. The at least one processor is further configured to detect the trailer and the tow-ball in the first image of the sequence of images using a trained learning model based on the first image and at least one scaled version of the first image, and estimate an area of interest using a tracking algorithm and locations of the detected trailer and the tow-ball in the first image. The area of interest corresponds to an area in the second image that will include the trailer with a probability that is higher than a first threshold. Furthermore, the at least one processor is configured to estimate a distance between the vehicle and the trailer based on the detected location of the trailer in the first image. Upon determining that the distance between the vehicle and the trailer is less than a second threshold, the at least one processor continuously detects locations of the trailer, tow-ball and a coupler attached to the trailer in each image of the sequence of images using the learning model and the estimated area of interest. The estimated area of interest is updated to correspond to an area of interest in the following image in the sequence of images. The at least one processor is further configured to actuate an action of the vehicle based on the detected locations of the trailer, tow-ball and the coupler.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

As used herein, the term "trailer" refers to an unpowered wheeled vehicle that may be towed by a vehicle. Trailers may include any wheeled vehicles used to transfer farm animals (e.g., horse trailer) or goods, recreational vehicles (RVs), boat trailers, and the like.

The terms "coupler", "trailer coupler" and "hitch coupler" may be used interchangeably throughout this specification to refer to the hitch coupler attached to a trailer that may be used to connect the trailer to a towing vehicle.

Maneuvering a vehicle to hitch a trailer and/or driving a vehicle while a trailer is being towed are very challenging tasks even for experienced drivers. As a result, trailer sway accidents are very common. Currently, the trailer hitching process is performed manually, in which a towing vehicle is moved in reverse direction towards the trailer. Due to the small size of the trailer coupler and a need for high accuracy alignment between the tow-ball attached to the vehicle and the coupler attached to the trailer, the trailer hitching process is very time-consuming and tedious.

Certain embodiments describe a robust automated trailer assist system that simplifies the trailer hitching process. The automated trailer assist system detects the trailer/tow-ball and the coupler, and generates a trajectory for moving the towing vehicle towards the trailer. The trailer assist system supports different types of tow-balls, trailers and couplers that may differ in their shape, size, color, material, and the like. In addition, the trailer assist system presented herein can operate in different weather conditions (e.g., sunny, rainy, snowy, etc.), different lighting conditions (e.g., night, day), with different variations in a scene (shady, direct sun, and the like).

One of the goals of the trailer assist system is to run in an embedded platform in real-time while the vehicle is moving. Movement of the vehicle may either be in forward direction while towing the trailer or in reverse direction (e.g., during the trailer hitching process or when backing out of a parking spot). Due to limited memory and processing power of embedded platforms, runtime efficiency of the trailer hitching system is very important. Certain embodiments track the trailer, tow-ball and the coupler using a single Convolutional Neural Network (CNN) to reduce processing load of the system. Unlike other existing methods, the disclosed trailer assist system does not have any restrictions on the distance between the vehicle and the trailer. Additionally, although focus of this disclosure is on a trailer with a tow-ball and a socket, other types of trailers (e.g., with fifth-wheel/gooseneck, trailer jack, and the like) may also be detected without departing from the teachings of the present disclosure.

In one embodiment, the trailer assist system tracks the trailer from the beginning of the hitching process while the distance between the towing vehicle and the trailer is far and starts detecting the coupler when the coupler becomes visible enough to detect. In addition, detecting tow-ball and estimating its size enables the system to handle different sizes of the tow-ball and uneven surfaces by accurately calculating height of the tow-ball from the ground for seamless automated hitching of the trailer coupler. For automated hitching process, center of the tow-ball (starting point of the trajectory) and center of the coupler (ending point of the trajectory), along with the trailer are detected/estimated with minimal error. Once the trailer is properly secured to the towing vehicle, the trailer assist system enters a second mode of operation and continuously tracks movement of the trailer and an angle between the longitudinal axis of the towing vehicle and the trailer. The estimated angle between the vehicle axis and the trailer can be utilized in several ADAS functions such as trailer park assist when in reverse gear, trailer sway detection when driving forward, trailer slip detection when driving across a slope, as well as visualization of trailer movement on a screen when needed.

Figure 1:
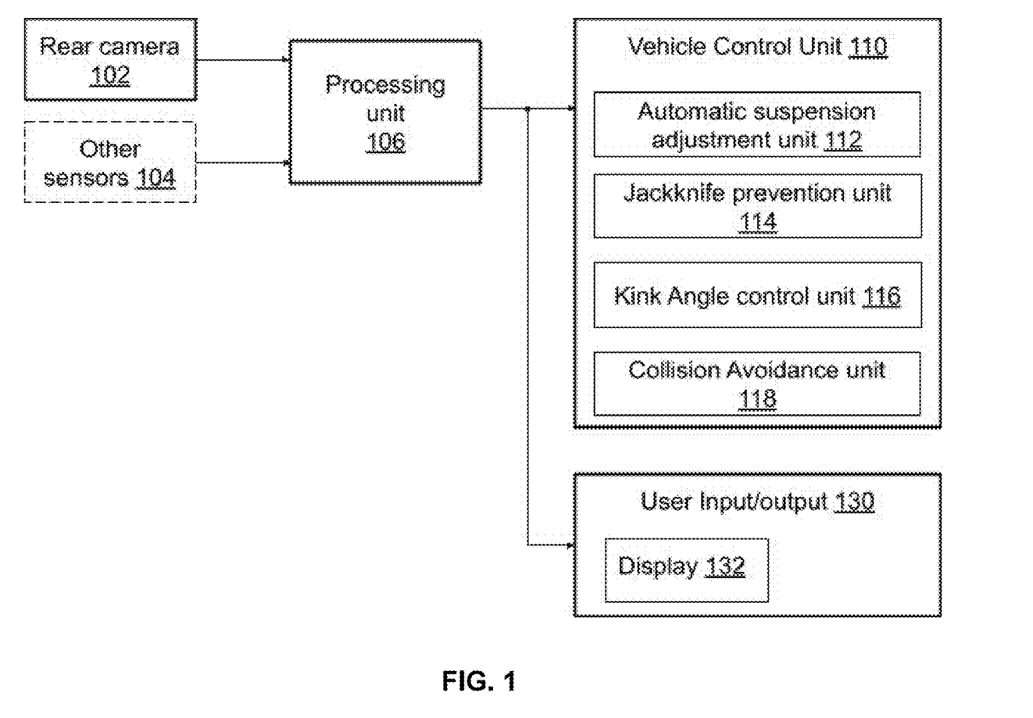
FIG. 1 illustrates a system in which one or more embodiments of the present disclosure can be implemented.

FIG. 1 illustrates a simplified example block diagram of the trailer assist system, according to one embodiment of the present disclosure. As illustrated, the trailer assist system includes a rear camera 102, one or more other sensors (e.g., vehicle odometry, side cameras, and the like) 104, a processing unit 106, a vehicle control unit 110, and a user input/output unit 130. It should be noted that any other unit may be added to, or removed from this example block diagram without departing from the teachings of the present disclosure.

The rear camera 102 is a camera sensor that can be located in the back of the towing vehicle. The rear camera can either be a standard rear-view fisheye camera or part of a surround-view camera suite comprising of four cameras around the vehicle. Any other type of camera may also be used without departing from the teachings of the present disclosure. In one embodiment, the camera 102 may be a commercial grade camera with one megapixel resolution and a wide horizontal field of view (FOV) of 190°. In this example, camera 102 can provide optimal near-field sensing up to 10 meters and slightly reduced perception up to 25 meters. Images from the camera 102 may be captured at a frame rate of, for example, 30 frames per second. In one embodiment, the camera 102 may have a high dynamic range (HDR) sensor with a rolling shutter and a dynamic range of 120 dBs. The camera may also have any other features such as black-level correction, auto-exposure control, auto-gain control, lens shading (e.g., optical vignetting) compensation, gamma correction, and automatic white balance (e.g., for color correction).

The captured images and information from other sensors may be sent to the processing unit 106. The processing unit 106 detects the trailer, coupler and the tow-ball using the stream of images captured by the rear camera 102. In addition, the processing unit tracks the tow-ball and the coupler in real time and generates a trajectory for the vehicle to be able to get in proper position with respect to the trailer so that the trailer hitching process can be performed. In one embodiment, the processing unit 106 may also estimate an angle between the trailer and the vehicle while the trailer is being towed. The estimated angle can be used to prevent jackknifing of the trailer. Jackknifing is a situation where trailer and vehicle fold together at the trailer hitch and resemble a jackknife. Jackknifing may happen during backing up of trailers when the articulation/hitch angle increases beyond a safe angle. Continuing a backward motion beyond the safe angle can worsen the situation and can possibly lead to contact of trailer with vehicle. This can also happen when the vehicle and the trailer are moving at high speeds.

In one embodiment, the vehicle control unit 110 may generate driver assist commands to help a driver while driving the vehicle. In another embodiment, the vehicle control unit 110 may generate control parameters such as speed, steering angle, brake to control the vehicle. The vehicle control unit may include automatic suspension adjustment unit 112, a jackknife prevention unit 114, a kink angle control unit 116, a collision avoidance unit 118, and the like. It should be noted that the above list of control units is not exhaustive and the vehicle control unit 110 may include any other control unit suitable for ADAS, automated or autonomous driving without departing from the teachings of the present disclosure.

The automatic suspension adjustment unit 112 adjusts the vehicle suspension so that the vehicle tow-ball can be connected to the trailer coupler during trailer hitching process. For example, the automatic suspension adjustment unit 112 may raise or lower the vehicle to level the vehicle with the trailer to properly connect the tow-ball with the coupler.

The jackknife prevention unit 114, constantly monitors the angle between the vehicle and the trailer while the vehicle is moving while towing the trailer to prevent jackknifing of the trailer. In one embodiment, upon detecting an imminent jackknifing situation, the jackknife prevention unit may act to prevent or reduce the jackknifing probability. As an example, the jackknife prevention unit 114 may notify the driver of the jackknifing danger, reduce the speed of the vehicle and the trailer, and change the steering angle of the vehicle or any other action.

The Kink angle control unit 116 monitors the kink angle and reacts when the kink angle is larger than a predefined threshold to ensure smooth towing of the trailer on winding roads.

The collision avoidance unit 118 monitors a distance between the vehicle and a vehicle in front of the vehicle to ensure safe operation of the vehicle. The collision avoidance unit 118 may apply an emergency brake when a distance between the vehicle and an object (e.g., other vehicles, pedestrians, bicycles, and the like) in the path of the vehicle becomes less than a threshold.

The user input/output unit 130 may receive any input from the driver of the vehicle and/or provide outputs to the driver. The user input/output unit may include a display unit 132 and any other input/output units. As an example, the display unit 132 may include a screen or a head up display (HUD) to display an image of the vehicle, the detected trailer, the tow-ball and/or the coupler, along with a trajectory for movement of the vehicle in reverse direction during the trailer hitching process to assist the driver with maneuvering towards the trailer.

Figure 2:
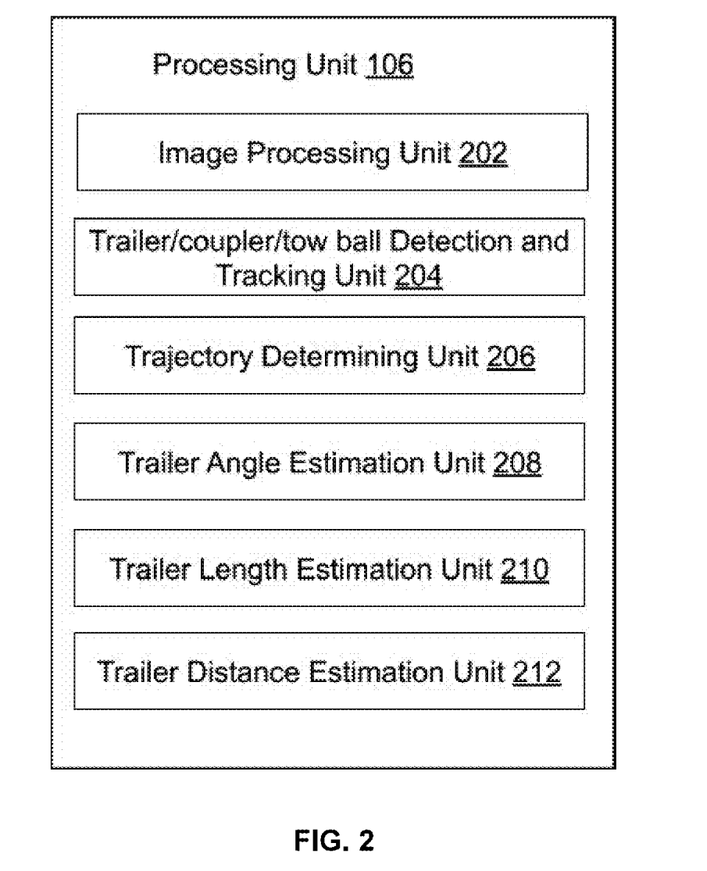
FIG. 2 illustrates the processing unit, according to one embodiment of the present disclosure.

FIG. 2 illustrates the processing unit 106 in more detail, according to one embodiment of the present disclosure. The processing unit 106 may include an image processing unit 202, a trailer/tow-ball/coupler detection and tracking unit 204, trajectory determining unit 206, trailer angle estimation unit 208, trailer length estimation unit 210, trailer distance estimation unit 212, and any other unit.

Image processing unit 202 may pre-process the sequence of images captured by the camera 102 before sending them to the trailer/tow-ball/coupler detection unit. The pre-processing may include distortion correction, contrast enhancement, de-noising, and the like.

The trailer/tow-ball/coupler detection and tracking unit 204 may use computer vision algorithms (e.g., a perception algorithm) to detect objects and understand the scene. In one embodiment, the trailer/tow-ball/coupler detection and tracking unit 204 utilizes a handcrafted feature extraction model for simultaneously detecting the trailer, tow-ball and the coupler in the received image. Detected coordinates of each of the trailer, tow-ball and coupler may be sent to a tracking unit that uses a tracking algorithm such as a Kalman filter or Long Short-Term Memory (LSTM) model to smoothen detections/predictions over time. In one embodiment, the trailer/tow-ball/coupler detection unit 204 may include two sub-models: A convolutional neural network (CNN) model for deep feature extraction and detection of trailers at multi-scale over a single image, and LSTM model for interpreting the features across time steps. The CNN model may work on a single image at a time, transforming image pixels into a deep representation. These features across multiple images allow the LSTM to build up an internal state and update one or more estimated weights. Since the trailer has a consistent temporal structure in the sequence of input images, the LSTM model can help to fill gaps if accurate detection is not possible from a single image due to occlusions, motion blur, shadows and/or severe lighting conditions.

The trajectory determining unit 206 determines a trajectory for the vehicle to reach the trailer and its coupler for trailer hitching assistance. The trajectory determining unit 206 may utilize position of the detected coupler in determining a trajectory overlay when the vehicle is close to the trailer. In addition, in one embodiment, when the vehicle is far from the trailer, location of the trailer can be used in determining the trajectory. The trajectory may be displayed by the display unit 132 as an overlay on the image to guide the driver. In another example, the estimated trajectory may be sent to a path planning unit for automated trailer hitching (e.g., without help from a driver).

The trailer angle estimation unit 208 continuously tracks movement of the trailer and estimates the angle between the trailer and longitudinal axis of the towing vehicle while the trailer is being towed. The estimated angle may be used to prevent trailer jackknife.

The trailer distance estimation unit 212 may continuously calculate a distance between the towing vehicle and the trailer. The estimated distance is used to detect the trailer/tow-ball and the coupler during trailer hitching process. The trailer distance estimation unit 212 only uses the images captured by the rear camera of the towing vehicle to determine the distance. In one embodiment, camera calibration values are used to generate a transformation matrix for distance calculation. Therefore, there is no need for any other sensor to measure the distance. The rear camera may be calibrated in advance using the images captured from one or two cameras on the side of the vehicle.

Figure 3:
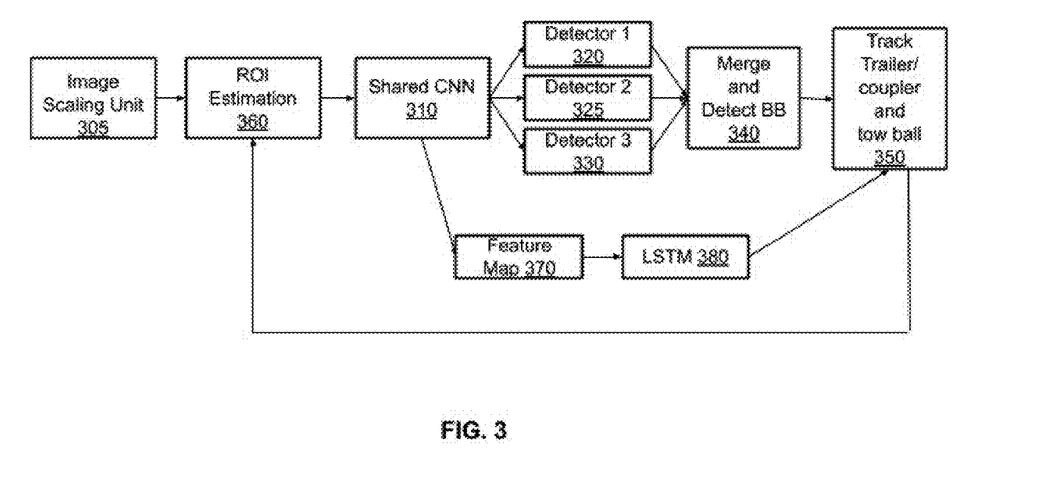
FIG. 3 illustrates an example block diagram of the trailer/coupler/tow-ball detection and tracking unit in more detail, in accordance with certain embodiments of the present disclosure.

FIG. 3 illustrates an example block diagram of the trailer/coupler/tow-ball detection and tracking unit 204 in more detail, in accordance with certain embodiments of the present disclosure. The trailer/coupler/tow-ball detection and tracking unit 204 may include an image scaling unit 305, a shared CNN unit 310, detection units 320, 325 and 330, a merge and detect bounding box unit 340, a tracking unit 350, an ROI estimation unit 360, a feature map unit 370, and a LSTM unit 380. It should be noted that this block diagram is merely a simplified example and any blocks may be added or deleted from this diagram without departing from the teachings of the present disclosure.

As illustrated, the input images passes through an image scaling unit 305 that outputs multiple scaled versions of the input image, each scaled with a predefined scaling factor. In one example, the image scaling unit may use scaling factors ½ and 2 to generate two scaled output images, one scaled with ½ and the other output scaled with scaling factor of two. In addition, the original image (i.e., scaling factor equal to one) is output from the image scaling unit. Multi-scale detection algorithms have been shown in the art to be more efficient than single scale detection algorithms. Physical dimensions and shapes of different trailers vary based on the manufacturer and purpose of use. The CNN model presented herein performs trailer detection using a number of scaled images.

Trailers are usually attached to the rear of vehicles and have very restricted range of motion compared to the vehicle. Once a trailer is detected in the first few frames following start of operation of the trailer assistance system, it might be safe to assume that the variations in trailer positions in the images are very small. The ROI estimation unit 360 determines a region of interest to narrow down the search window during the inference over time. As an example, first few initial input images may be processed at full size when the towing vehicle starts moving towards the trailer from an idle state. When confidence in trailer bounding box estimation becomes higher than a threshold in consecutive input images (e.g., the trailer is localized), the ROI can be determined based on the trailer bounding box dimensions. The ROI estimation block may then crop the input images to only include the region of interest before sending them to the shared CNN unit 310.

In one example embodiment, the following ROI criteria may be used that yields preferred performance and meets run-time constraints of the trailer assistance system.

$$ROI = MAX(ROI\text{-}TH \times InH, 1.5 \times BBH) \times MAX(ROI\text{-}TH \times InW, 2.0 \times BBW)$$

where InH represents number of pixels in Y direction (e.g., Height of the input image), InW represents number of pixels in X direction (e.g., Width of the input image). BBH and BBW represent height and width of the bounding box of the detected trailer, respectively. In addition, ROI-TH represents the threshold for selecting the region of interest.

To crop the image, center of the trailer bounding box from the previous frame is identified and the ROI width and height are applied to crop around the center position. In one embodiment, to simplify operations, cropped images are resized so that their width and height are multiples of 32. In this way, although variable sized feature maps may be output from the CNN model, size of all the images will be a multiple of 32.

Cropped versions of the original input image and the scaled images may then enter the shared CNN unit 310. Outputs of the shared CNN block enter three detection units 320, 325 and 330 to detect trailer/tow-ball and coupler in each of the scaled and the original input images. When the trailer is far from the vehicle, the shared CNN unit 310 detects the trailer only. When the distance between the trailer and the vehicle reaches a predefined threshold (e.g., 3 m), the shared CNN unit 310 starts detecting the tow-ball and the coupler in addition to the trailer. Appearance of the coupler may vary significantly depending on the distance between the towing vehicle and the trailer and the coupler. Thus, two different models for near-field and far-field may be employed. When the trailer and the coupler are far from the vehicle, the far-field model can be used. Similarly, when the distance between the trailer and the towing vehicle is less than the predefined threshold, the near-field model can be employed to detect the coupler.

The shared CNN unit 310 identifies and locates the tow-ball position, localizes the coupler and calculates a position of the center of the coupler without any need to have a known reference target on the trailer. Commonly used tow-balls and couplers with Pintle hitches, and any other types of tow-ball/coupler can also be detected as long as the model is trained using images of the specific types. Since there is no standardized appearance for the tow-balls and couplers, the system may be trained with a variety of different types of tow-balls and couplers to be able to identify them correctly.

In one example, a frame size of 1280×800 can be used for the input image coming from rearview camera sensor. Scaled images are cropped at size 512×512 before entering the CNN model. For each convolution operation, 1×1 projection is performed before the main convolution to reduce the depth of the feature map. This results in two benefits: Reduction in number of parameters and runtime/speed improvement. Depth of the feature map is restored using another 1×1 projection after the main convolution is performed. In between each convolution, batch normalization and Leaky ReLU (activation function) may be performed.

Merge and detect bounding box block 340 receives the detected trailer/tow-ball and couplers from each of the detection units 320, 325 and 330, and merges them to obtain a final bounding box estimate for each of the trailer/tow-ball and the coupler in the original input image. The tracking unit

350 may select the best candidate from the LSTM unit 380 and Merge and detect BB unit 340 and track that bounding box.

Outputs of the convolution layers in the shared CNN model may also be sent to a feature map unit 370. The feature map unit consist of a zero padding layer to convert the output to a fixed length vector as input ROI dimensions changes during the run time. In one example, a feature vector length may be fixed to 16640. The feature map unit is followed by an LSTM layer 380 with five output units. These five units regress for bounding box dimensions and coordinates similar to detection decoder modules. The final bounding box predictions from the merge and detect BB unit 340 and the LSTM unit 380 are sent through a Non Maximal Suppression (NMS) algorithm to produce a single robustly detected bounding box around each of the trailer/tow-ball and coupler. It should be note that because of sliding window nature of processing the image while looking for trailer/tow-ball and coupler, two or more candidates may be detected. The NMS algorithm may be used to filter out best candidate(s) using a filtering criteria (e.g., selecting the candidate with the highest confidence on detection).

Integration of Hitch Coupler and Tow-ball Localization:

In one embodiment, the system illustrated in FIGS. 1, 2 and 3 is used to locate the tow-ball and the coupler in addition to the trailer. Once a minimum distance criteria is met while backing towards the parked trailer, a second mode of operation of the system is initiated. The second mode of operation localizes the hitch couple and tow-ball in addition to the trailer. In the first mode of operation, a far-side detection decoder in the CNN-LSTM model is used to detect the trailer. In the second mode of operation, a near-side detection decoder is used which detects the coupler and the tow-ball. In one embodiment, the same encoder block of the CNN-LSTM model is used to detect the coupler and the tow-ball. However, the detector is tuned for the new, smaller object size. Kalman filter and/or LSTM model may be used to track the detected objects and select the ROI for detecting the objects in the next frame.

Figure 4:
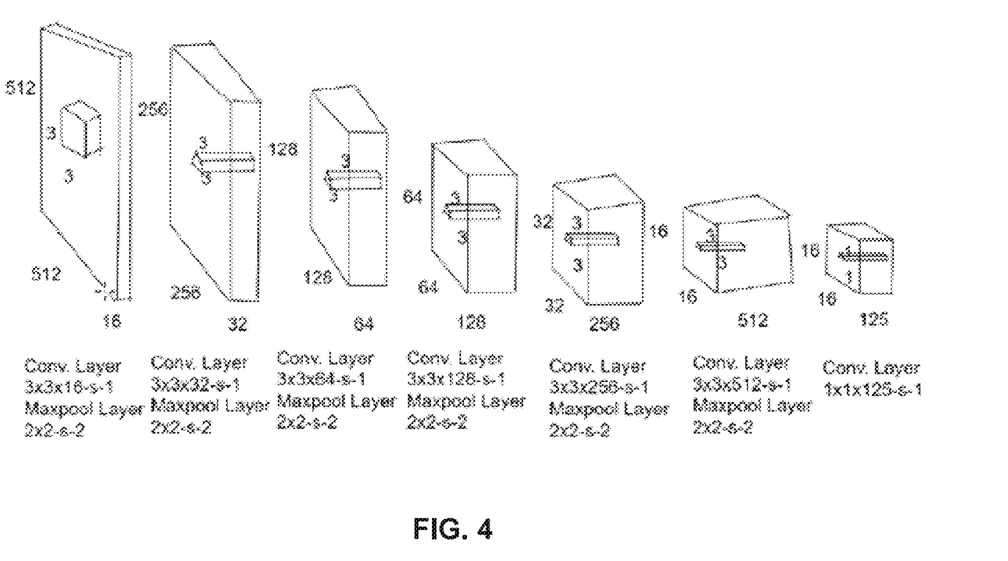
FIG. 4 illustrates an example architecture for the CNN model, in accordance with certain aspects of the present disclosure.

FIG. 4 illustrates an example architecture for the CNN model, in accordance with certain aspects of the present disclosure. As illustrated, the CNN model may have several convolution layers. Without loss of generality, example model illustrated herein has seven convolution layers, however, the model may have any number of layers without departing from the teachings of the present disclosure. The first convolution layer may use Parametric Rectified Linear Unit (PReLU) model and batch normalization. Each of the rest of the convolution layers may have MAX pool in addition to the PReLU and batch normalization. Rectified Liner Unit (ReLU) is a simple activation function that is commonly used in neural network systems. However, ReLU has vanishing gradient problem, which is resolved in PReLU. Batch Normalization is a technique to train Deep Neural Networks that standardizes the input for each mini-batch. This results in stabilizing the learning process as well as speeding up the learning process. Max polling algorithm refers to down sampling an input representation to reduce its dimension, which results in reduced computational cost and provides basic translation invariance.

Figure 5:
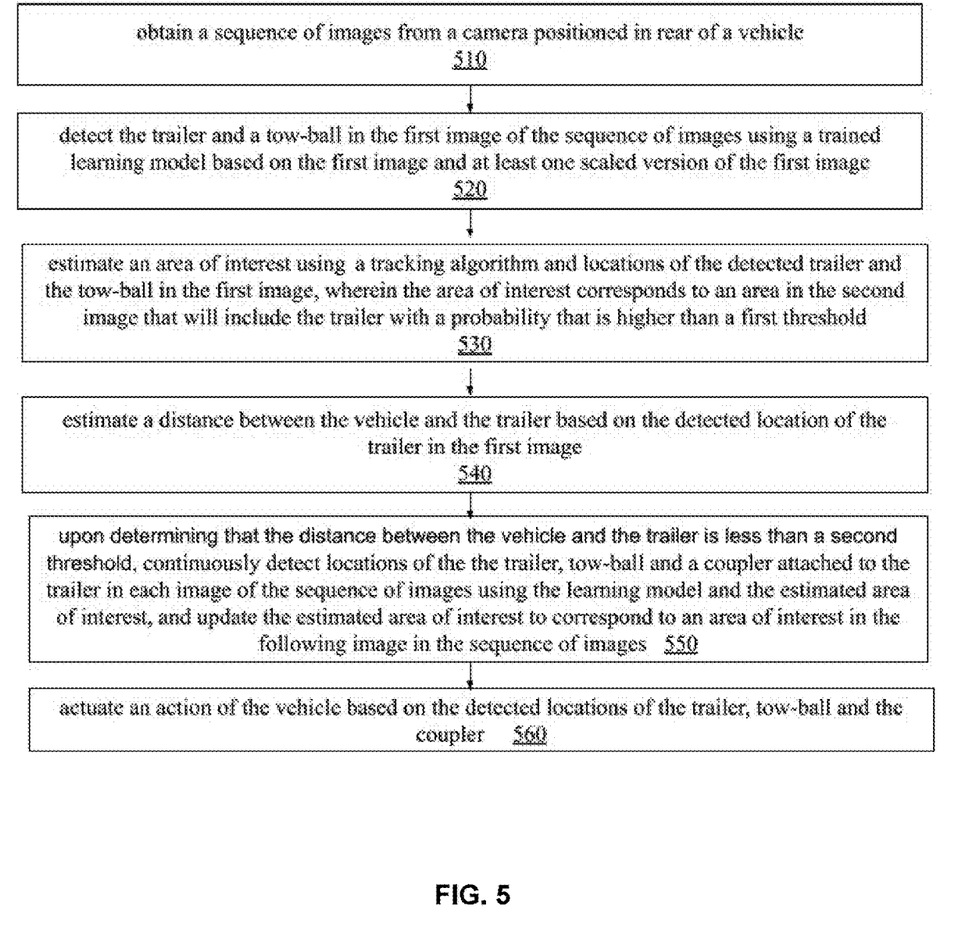
FIG. 5 illustrates example operations that may be performed by a system to detect and track a trailer/tow-ball and coupler, in accordance with certain aspects of the present disclosure.

FIG. 5 illustrates example operations that may be performed by a system to detect and track a trailer/tow-ball and coupler, in accordance with certain aspects of the present disclosure. At 510, the system obtains a sequence of images from a camera positioned in rear of a vehicle. Field of view of the camera may include at least a tow-ball attached to the vehicle and a trailer located in the scene behind the vehicle. The sequence of images are being captured continuously at a sequence of predefined time stamps while the vehicle is moving. For example, the first image is captured at a first time stamp and the second image is captured at a second time stamp following the first timestamp.

At 520, the system detects the trailer and a tow-ball in the first image of the sequence of images using a trained learning model based on the first image and at least one scaled version of the first image. At 530, the system estimates an area of interest using a tracking algorithm and locations of the detected trailer and the tow-ball in the first image. The area of interest corresponds to an area in the second image that will include the trailer with a probability that is higher than a first threshold. The first threshold can, for example, be 98 percent probability of existence of the trailer in the area of interest.

At 540, the system estimates a distance between the vehicle and the trailer based on the detected location of the trailer in the first image. At 550, upon determining that the distance between the vehicle and the trailer is less than a second threshold, the system continuously detects locations of the trailer, tow-ball and a coupler attached to the trailer in each image of the sequence of images using the learning model and the estimated area of interest, and updates the estimated area of interest to correspond to an area of interest in the following image in the sequence of images.

At 560, the system actuates an action of the vehicle based on the detected locations of the trailer, tow-ball and the coupler. In one example, the action may include generating a graphical representation of one or more of the detected trailer, coupler and the tow-ball and a trajectory overlay for connecting the tow-ball to the coupler, and displaying the generated graphical representation to a driver of the vehicle to assist in moving the vehicle in reverse direction towards the trailer. In another example, the action may include determining a trajectory from the vehicle to the trailer using detected locations of the tow-ball and the coupler, and autonomously moving the vehicle in reverse direction towards the trailer by following the trajectory from the tow-ball to the coupler. In yet another example, the action may include calculating an angle between the trailer and the vehicle while the vehicle is moving by continuously detecting and tracking movement of the trailer, and actuating a jackknife prevention action to avoid a trailer jackknife situation.

Figure 6:
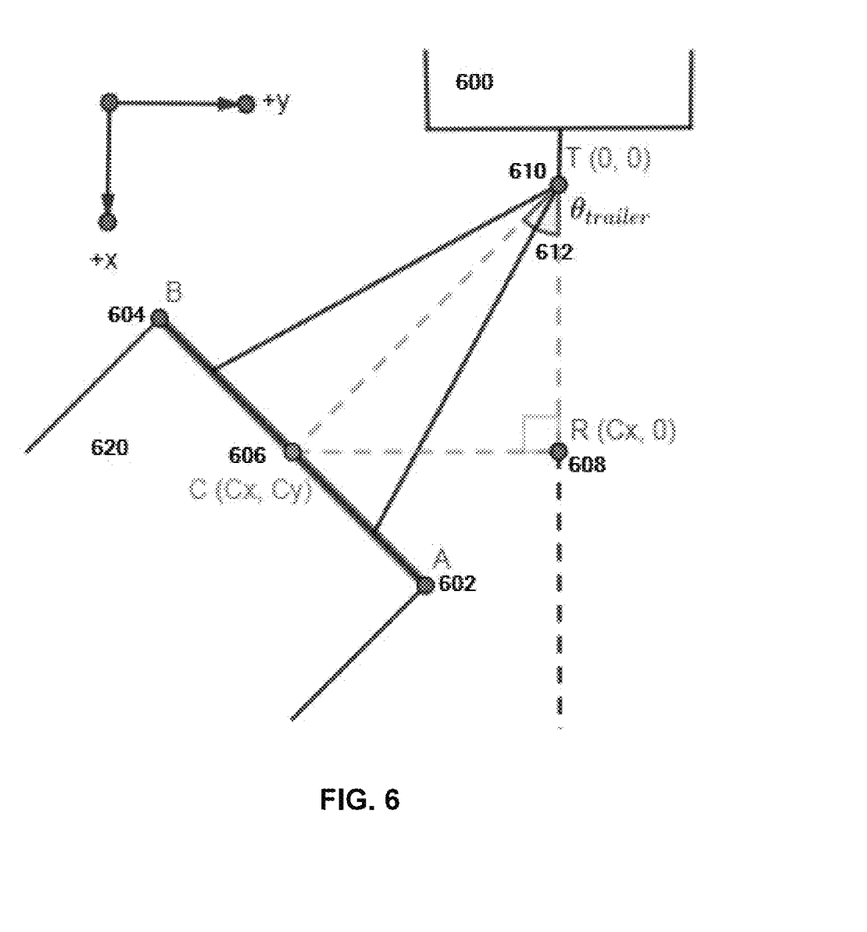
FIG. 6 illustrates an example method to estimate the trailer angle from the input images, in accordance with certain embodiments of the present disclosure.

FIG. 6 illustrates an example method to estimate the trailer angle from the input images. A trailer angle may be defined as the yaw angle with respect to the central axis of the vehicle. In one example, the center point of bottom side/edge of the trailer bounding box (Cx, Cy) may be projected from image plane into vehicle coordinates (e.g., world coordinates (Cx, Cy, Cz)). Using the known position of the tow-ball in vehicle coordinates (derived from vehicle mechanical data) and center of the trailer bounding box, trailer angle may be estimated. The estimated trailer angle can be used to prevent trailer swing that may lead to jackknife. The estimated trailer angle can also help the trailer backup assist system as well as view switching. As illustrated in FIG. 6, the estimated trailer bounding box marks the front portion of the trailer 620 that is being tracked (e.g., a line connecting points A 602 and B 604). The following parameters are available from the estimated bounding box: Bounding Box Width, Bounding Box Height, Bounding Box Center X coordinate (i.e., $C_x$), Bounding Box Center Y coordinate (i.e., $C_y$), and Bounding Box Angle. The trailer angle θ 612 may be calculated as follows:

$$\theta = \arccos\left(\frac{RT}{CT}\right)$$

in which R 608 represents a reference point, T 610 shows position of the tow-ball 610 connected to the towing vehicle 600, and C 606 represents the center of the bounding box.

Figure 7:
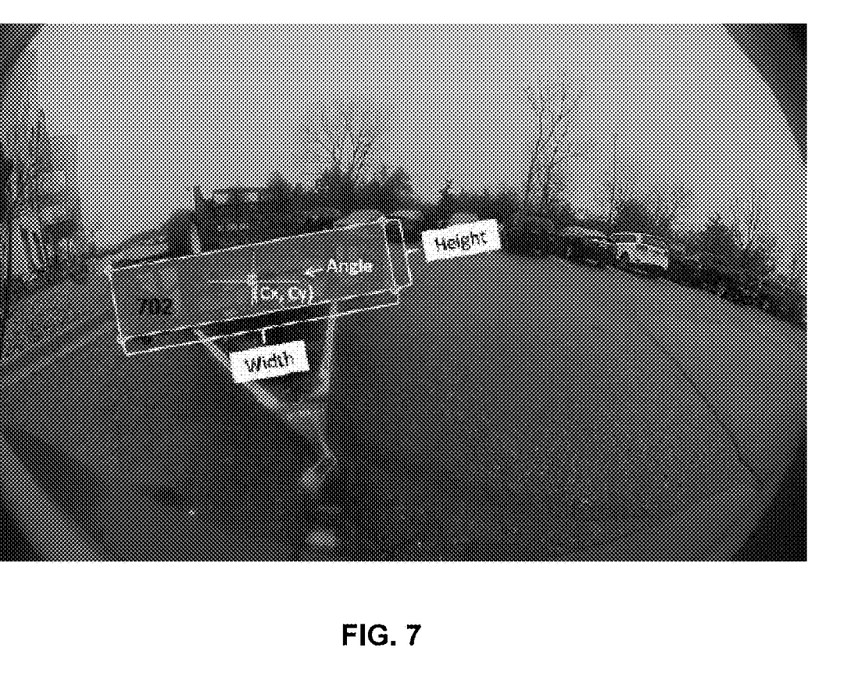
FIG. 7 illustrates an example image in which the bounding box is overlaid on the trailer image.

FIG. 7 illustrates an example image in which the bounding box 702 is overlaid on the trailer image. A rear camera attached to the towing vehicle has captured this image. As can be seen in the image, the estimated bounding box 702 for the trailer may or may not be parallel to the ground surface. Transformation from Image Coordinates to World Coordinates In order to calculate the distance from the tow-ball to the trailer or the coupler, coordinates of a central point of each of the detected objects should be transformed from image coordinates to vehicle coordinates. In one embodiment, camera calibration parameters can be used to transform the coordinates from image coordinates to vehicle coordinates. Some of the camera calibration parameters are extrinsic and some of the parameters are intrinsic. Each point can be transformed from vehicle or world coordinates to camera coordinates using the extrinsic parameters. In addition, the camera coordinates can be mapped into the image plane using the intrinsic parameters. Once image coordinate points are mapped to the world/vehicle coordinate system, distance of each point on the trailer can be calculated from the tow-ball. In one example, the transformation can be done as follows:

$$W[xy\ 1] = [XYZ\ 1]P$$

In which W represents a scaling factor. W=1 means no scaling is needed. [x y 1] represents each of the points in the image, and [X Y Z 1] represents each of the points in world coordinates. P represents a camera $$\text{matrix} = \left[\frac{R}{t}\right]K,$$

in which K is a rotation matrix, t is a translation matrix, and K represents camera intrinsic parameters.

In one embodiment, three independent datasets are used for the three tasks namely trailer angle estimation, coupler localization and tow-ball localization. Trailer angle estimation is the main task as it runs all the time whenever the trailer is connected and thus it has a larger dataset. The trailer angle estimation includes 1400 images extracted using eleven different types of trailers. The scenes contain different environmental conditions including daylight, shadows and rain. The driving surface had both asphalt roads and grass. Training/Validation/Test split is of the ratio 60/15/25. Coupler localization and tow-ball localization use datasets of 500 images, respectively with similar ratio of dataset split as in the trailer data set. In one example, ground truth for detection of trailer, coupler and tow-ball were done manually and ground truth for the trailer angle was generated using a rotary encoder.

For certain embodiments, a pixel based semantic segmentation approach based model may be used as a shared CNN model in the system presented herein to segment tow-ball, trailer and coupler. After segmentation, based on the segmented area of the tow-ball, trailer and the coupler, center points of all the detected objects may be calculated and tracked. The rest of the process may be similar to the system shown in FIG. 3.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments. Also, a number of steps may be undertaken before, during, or after the above elements are considered. Accordingly, the above description does not limit the scope of the disclosure to the exact embodiments described.

What is claimed is:

1. A method for tracking a trailer, comprising:
obtaining a sequence of images from a camera positioned at a rear end of a vehicle,
wherein a field of view of the camera comprises at least a tow-ball attached to the vehicle and a trailer located in a scene behind the vehicle;
wherein the sequence of images is captured continuously at a sequence of predefined time stamps while the vehicle is moving; and
wherein a first image is captured at a first time stamp and a second image is captured at a second time stamp;
detecting the trailer and the tow-ball in the first image of the sequence of images using a trained learning model based on the first image and at least one scaled version of the first image, the detection comprising:
  scaling the first image using a first scaling factor and a second scaling factor to generate a first scaled image and a second scaled image, respectively;
  detecting the trailer in the first image using the trained learning model and a first detector to generate a first detected location;
  detecting the trailer in the first scaled image using the trained learning model and a second detector to generate a second detected location;
  detecting the trailer in the second scaled image using the trained learning model and a third detector to generate a third detected location; and
  combining the first, the second and the third detected locations to generate a bounding box corresponding to the location of the trailer in the first image;
estimating an area of interest using a tracking algorithm and locations of the detected trailer and the tow-ball in the first image, wherein the area of interest corresponds to an area in the second image that will include the trailer with a probability that is higher than a first threshold;
estimating a distance between the vehicle and the trailer based on the detected location of the trailer in the first image; and
upon determining that the distance between the vehicle and the trailer is less than a second threshold:
  continuously detect locations of the trailer, tow-ball, and a coupler attached to the trailer in each image of the sequence of images using the learning model and the estimated area of interest;
  update the estimated area of interest to correspond to an area of interest in a following image in the sequence of images; and
  actuating an action of the vehicle based on the detected locations of the trailer, tow-ball, and the coupler.

2. The method of claim 1, wherein the area of interest comprises an area that is larger than an estimated bounding box for the trailer.

3. The method of claim 1, wherein estimating the distance between the vehicle and the trailer based on the detected location of the trailer in the first image comprises: calculating the distance between the vehicle and the trailer using the detected location and one or more calibration values of the camera.

4. The method of claim 3, wherein the one or more calibration values are determined in advance based on a plurality of calibrating images captured by at least a second camera located on a side of the vehicle.

5. The method of claim 1, further comprising:
generating a graphical representation of one or more of the detected trailer, coupler, and the tow-ball, and a trajectory overlay for connecting the tow-ball to the coupler,
wherein the action of the vehicle comprises displaying the generated graphical representation to a driver of the vehicle to assist in moving the vehicle in reverse direction towards the trailer.

6. The method of claim 1, further comprising: calculating an angle between the trailer and the vehicle while the vehicle is moving by continuously detecting and tracking movement of the trailer; and wherein actuating an action of the vehicle comprises actuating a jackknife prevention action to avoid a trailer jackknife situation.

7. The method of claim 1, wherein the action of the vehicle comprises: determining a trajectory from the vehicle to the trailer using detected locations of the tow-ball and the coupler; and autonomously moving the vehicle in reverse direction towards the trailer by following the trajectory from the tow-ball to the coupler.

8. An apparatus for tracking a trailer, comprising a memory and at least one processor coupled to the memory, the at least one processor configured to:
obtain a sequence of images from a camera positioned at a rear end of a vehicle,
wherein a field of view of the camera comprises at least a tow-ball attached to the vehicle and a trailer located in a scene behind the vehicle;
wherein the sequence of images is captured continuously at a sequence of predefined time stamps while the vehicle is moving; and
wherein a first image is captured at a first time stamp and a second image is captured at a second time stamp;
detect the trailer and the tow-ball in the first image of the sequence of images using a trained learning model based on the first image and at least one scaled version of the first image, the detection comprising:
  scaling the first image using a first scaling factor and a second scaling factor to generate a first scaled image and a second scaled image, respectively;
  detecting the trailer in the first image using the trained learning model and a first detector to generate a first detected location;
  detecting the trailer in the first scaled image using the trained learning model and a second detector to generate a second detected location;
  detecting the trailer in the second scaled image using the trained learning model and a third detector to generate a third detected location; and
  combining the first, the second and the third detected locations to generate a bounding box corresponding to the location of the trailer in the first image;
estimate an area of interest using a tracking algorithm and locations of the detected trailer and the tow-ball in the first image, wherein the area of interest corresponds to an area in the second image that will include the trailer with a probability that is higher than a first threshold;
estimate a distance between the vehicle and the trailer based on the detected location of the trailer in the first image; and
upon determining that the distance between the vehicle and the trailer is less than a second threshold:
  continuously detect locations of the trailer, tow-ball and a coupler attached to the trailer in each image of the sequence of images using the learning model and the estimated area of interest;
  update the estimated area of interest to correspond to an area of interest in a following image in the sequence of images, and
  actuate an action of the vehicle based on the detected locations of the trailer, tow-ball and the coupler.

9. The apparatus of claim 8, wherein the first area of interest comprises an area that is larger than an estimated bounding box for the trailer.

10. The apparatus of claim 8, wherein the at least one processor configured to estimate the distance between the vehicle and the trailer based on the detected location of the trailer in the first image is further configured to calculate the distance between the vehicle and the trailer using the detected location and one or more calibration values of the camera.

11. The apparatus of claim 10, wherein the one or more calibration values are determined in advance based on a plurality of calibrating images captured by at least a second camera located on a side of the vehicle.

12. The apparatus of claim 8, wherein the at least one processor is further configured to generate a graphical representation of one or more of the detected trailer, coupler, and the tow-ball, and a trajectory overlay for connecting the tow-ball to the coupler, wherein the action of the vehicle comprises displaying the generated graphical representation to a driver of the vehicle to assist in moving the vehicle in reverse direction towards the trailer.

13. The apparatus of claim 8, wherein the at least one processor is further configured to:
  calculate an angle between the trailer and the vehicle while the vehicle is moving by continuously detecting and tracking movement of the trailer; and
  actuate a jackknife prevention action to avoid a trailer jackknife situation.

14. The apparatus of claim 8, wherein the at least one processor is further configured to:
  determine a trajectory from the vehicle to the trailer using detected locations of the tow-ball and the coupler;
  autonomously move the vehicle in reverse direction towards the trailer by following the trajectory from the tow-ball to the coupler.

15. A non-transitory computer-readable storage medium storing instructions that, when executed by one or more processors of a vehicle computer system, cause the one or more processors to perform the following:
  obtain a sequence of images from a camera positioned in rear of a vehicle,
  wherein a field of view of the camera comprises at least a tow-ball attached to the vehicle and a trailer located in a scene behind the vehicle;
  wherein the sequence of images is captured continuously at a sequence of predefined time stamps while the vehicle is moving; and
  wherein a first image is captured at a first time stamp and a second image is captured at a second time stamp;
  detect the trailer and a tow-ball in the first image of the sequence of images using a trained learning model based on the first image and at least one scaled version of the first image, the detection comprising:
    scaling the first image using a first scaling factor and a second scaling factor to generate a first scaled image and a second scaled image, respectively;
    detecting the trailer in the first image using the trained learning model and a first detector to generate a first detected location;
    detecting the trailer in the first scaled image using the trained learning model and a second detector to generate a second detected location;
    detecting the trailer in the second scaled image using the trained learning model and a third detector to generate a third detected location; and
    combining the first, the second and the third detected locations to generate a bounding box corresponding to the location of the trailer in the first image;
  estimate an area of interest using a tracking algorithm and locations of the detected trailer and the tow-ball in the first image, wherein the area of interest corresponds to an area in the second image that will include the trailer with a probability that is higher than a first threshold;
  estimate a distance between the vehicle and the trailer based on the detected location of the trailer in the first image;
  upon determining that the distance between the vehicle and the trailer is less than a second threshold:
    continuously detect locations of the trailer, tow-ball and a coupler attached to the trailer in each image of the sequence of images using the learning model and the estimated area of interest;
    update the estimated area of interest to correspond to an area of interest in a following image in the sequence of images; and
    actuate an action of the vehicle based on the detected locations of the trailer, tow-ball and the coupler.

16. The non-transitory computer-readable storage medium of claim 15, wherein the first area of interest comprises an area that is larger than an estimated bounding box for the trailer.

17. The non-transitory computer-readable storage medium of claim 15, wherein estimating the distance between the vehicle and the trailer based on the detected location of the trailer in the first image comprises calculate the distance between the vehicle and the trailer using the detected location and one or more calibration values of the camera.

* * * * *